UNITED STATES PATENT OFFICE.

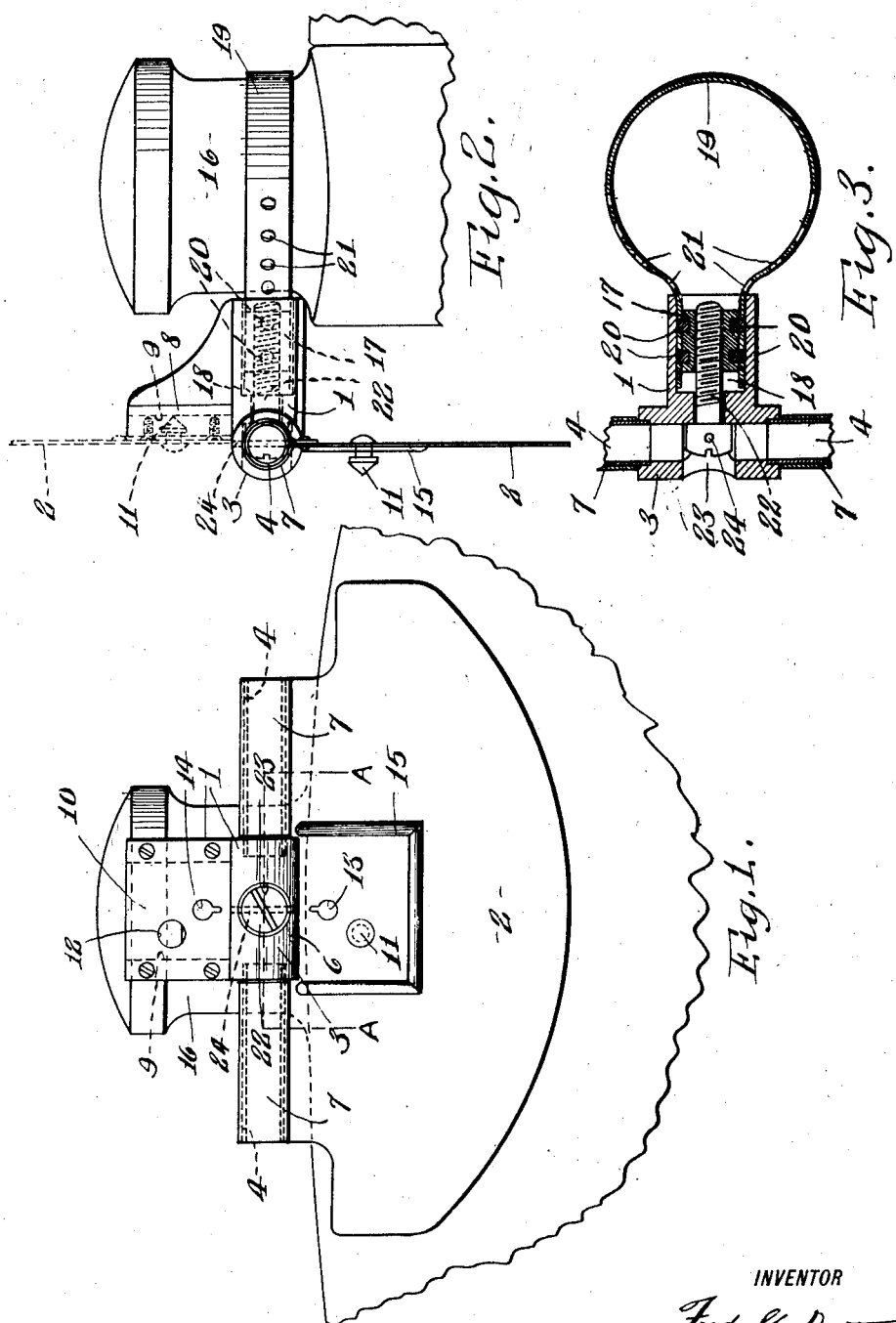

FRED G. DUTTON, OF ONONDAGA, NEW YORK.

THEFT-PREVENTING DEVICE FOR MOTOR-CARS.

1,335,160.      Specification of Letters Patent.      Patented Mar. 30, 1920.

Application filed May 22, 1918. Serial No. 235,926.

*To all whom it may concern:*

Be it known that I, FRED G. DUTTON, a citizen of the United States, and a resident of Onondaga, in the county of Onondaga and State of New York, have invented a certain new and useful Theft-Preventing Device for Motor-Cars, of which the following is a specification.

This invention has for its object a theft preventing attachment for motor cars for indicating a stolen car when in motion, which device is particularly simple in construction and highly efficient and durable in use, and readily detachable to the motor car. The invention consists in the novel features and in the combinations and constructions hereinafter set forth and claimed.

In describing this invention, reference is had to the accompanying drawings in which like characters designate corresponding parts in all the views.

Figure 1 is a front elevation of this theft preventing device, the same being shown as attached to the radiator cap of a motor car, the leaf or telltale thereof being shown as folded down into its inoperative position assumed when the car is being driven by the owner.

Fig. 2 is a side elevation of parts seen in Fig. 1, in which it is placed when the car is left standing or parked, the leaf being shown in dotted lines in its effective position.

Fig. 3 is a sectional view on line A—A, Fig. 1.

This device comprises generally, a support or bracket, means for attaching the same to a part as the radiator cap of an automobile, a telltale in the form of a leaf movably carried by the bracket and shiftable into different positions relatively thereto, and a key operated lock for holding the telltale in one of such positions that is, in the position in which it is placed when the car is parked or left standing, to indicate that the car is stolen if in motion.

1 designates the support or bracket which may be of any suitable form, size and construction, it being usually formed of strong or tough metal which cannot be broken off by a blow of a hammer or similar tool.

2 designates the telltale which is in the form of a leaf hinged to the bracket and movable about its hinge from an upright vertical position shown in dotted lines in Fig. 2 to an inverted vertical position shown in Fig. 1 and in full lines, Fig. 2.

As here shown, the bracket is formed with a knuckle 3 having laterally extending spindles 4, and the leaf 2 is formed with a central cutout 6 registering with the knuckle 3 and tubular rolls or bearings 7 located on opposite sides of the cutout and mounted on the spindles 4. The bracket, leaf and spindles are assembled in any convenient manner. The bracket and the leaf are formed with faces arranged to come into position opposed to each other, and one of said parts 1, 2 is provided with a key operated lock and the other with a bolt for entering the lock in order to lock the leaf to the bracket when in its upright or effective position.

As here shown, the bracket 1 is formed with an upward extension 8 provided with a recess 9 in which a casing 10 containing a suitable lock mechanism is located, and the leaf 2 is formed with a bolt or shoulder 11 arranged to enter a suitable opening 12 in the casing 10 and interlock with the mechanism of the lock, this mechanism being operated by a key insertible through a keyhole 13 formed in the leaf 2 and registering with the key-hole 14 in the casing 10. However, any other arrangement of the locking mechanism may be used.

In order to prevent the insertion of a prying tool between the bracket and the leaf 2 when the leaf is in locked position, the leaf is formed with a shield lapping or fitting over the portion 8 of the bracket in which the casing 10 is located, this shield being formed in any suitable manner as by pressing a raised bead 15 from the leaf 2 or by forming a depression therein, the side walls of which fit over the portion 8 of the bracket containing the lock casing 10.

The means for securing the bracket to a part of the motor car as the radiator cap 16, comprises means located internally of the bracket so as to be inaccessible when the leaf is locked in upright position. This means, as here illustrated, includes a block 17 located in a forwardly extending passage 18 opening through the rear face of the bracket, a metal strap 19 designed to encircle the radiator cap 16 or other part, and the strap 19 having its ends extending into opposing sides of the passage 18 between the block 17 and the walls of the socket.

The block 17 is preferably provided with spaced apart shoulders or pins 20 thereon arranged to enter, selectively, perforations 21 in the strap. By reason of the perforations 21 and the pins 20 the strap can be expanded or contracted to snugly fit the radiator caps or other parts of different diameters.

The bracket is secured to its attaching means by a fastening member here shown as a screw 22 extending through the bracket from the front side thereof and threading into the block 17, the screw extending transversely through the knuckle 3 and having its head located in a countersink 23 therein. The screw 22 is held from detachment by a locking pin or key 24 extending transversely or radially through the knuckle and the head of the screw, the key 24 having its head lying on the upper surface of the knuckle 3 in position to be covered by the edge of the leaf 2 when the leaf is in its effective position. Hence, detachment of the bracket is prevented when the leaf is in its operative position.

In use, the device is attached to the radiator cap or other suitable part of an automobile where it is conspicuous and when the car is being driven by the owner or an authorized person, the leaf 2 is unlocked and folded into the position shown in Fig. 1. When however, the car is parked or is left standing, the leaf is swung into its upright position the bolt 11 entering the lock casing 10 so that the leaf is locked in its upright position.

The leaf when in its upright position indicates that if the car is in motion it is stolen, and may contain any suitable phrase as "This car is stolen if in motion."

Owing to the construction of the bracket 1, leaf 2, lock casing 10 and means for attaching the bracket to the radiator cap or other part, removal of the device from the car is prevented when the leaf is locked in effective position. Also change of position of the leaf is prevented and any attempt to change the position of the leaf would mutilate the leaf so that this fact itself would show that the car was stolen.

What I claim is:

1. A theft preventing attachment for motor cars comprising a supporting bracket having means for attachment to a motor car, a movable telltale supported by the bracket and shiftable into different positions relatively thereto, the bracket and the telltale having faces arranged to lie flatwise against each other when the telltale is in one of its positions, and a lock including interlocking parts mounted respectively on said faces in position to be inaccessible when the telltale is in the positions occupied when said faces lie flatwise against each other, substantially as and for the purpose set forth.

2. A theft preventing attachment for motor cars comprising a bracket having means for attachment to the motor car, and a fastening member connecting the bracket to the attaching means, a telltale movably connected to the bracket and movable into different positions, and means for locking the telltale to the bracket when the telltale is in its effective position, said telltale being arranged when in its locked position to cover the fastening member to make it inaccessible for the purpose of removing the bracket, substantially as and for the purpose described.

3. A theft preventing device for motor cars comprising a supporting bracket, a telltale in the form of a leaf hinged to the bracket, means for attaching the bracket to a part of the motor car, a fastening member connecting the bracket and the attaching means, means for holding the fastening member from removal, and a lock for locking the telltale in its effective position, the holding means for the fastening member being arranged in position to be held from detachment when the telltale is locked in its operative position, substantially as and for the purpose set forth.

4. A theft preventing device for motor cars comprising a supporting bracket formed with a knuckle and spindles extending in opposite directions from the knuckle, a telltale in the form of a leaf having bearings mounted on the spindles, means for locking the leaf to the bracket when the telltale is swung into its effective position, means for attaching the bracket to a part of the vehicle comprising a screw extending transversely through the knuckle into the bracket and having its head exposed on the front side of the bracket, a locking key for the screw extending transversely through the knuckle and the screw and being arranged to be shielded by the leaf when in its effective position, substantially as and for the purpose described.

5. A theft preventing device for motor cars comprising a bracket, a telltale in the form of a leaf hinged to the bracket and movable into different radial positions relatively thereto, the bracket and the leaf having faces arranged to come opposite each other when the leaf is in its effective positions, a lock associated with one of the parts having said opposing faces and being exposed on one of said faces, and a shoulder provided on the other of said faces for entering the lock, substantially as and for the purpose set forth.

6. A theft preventing device for motor cars comprising a supporting bracket, a telltale movably carried by the bracket and shiftable into different positions relatively thereto, means for locking the telltale to the bracket, and means for attaching the bracket to a part of the motor car including a collar, and means located internally of the bracket for securing the collar to the bracket, substantially as and for the purpose described.

7. A theft preventing device for motor cars comprising a supporting bracket, a telltale movably carried by the bracket and shiftable into different positions relatively thereto, means for locking the telltale to the bracket, and means for attaching the bracket to a part of the motor car including an expansible and contractile collar, and means located internally of the bracket for adjustably securing the collar to the bracket, substantially as and for the purpose specified.

8. A theft preventing device for motor cars comprising a supporting bracket, a telltale in the form of a leaf movably supported by the bracket and shiftable into different positions relatively thereto, means for locking the leaf to the bracket when in one of said positions, the bracket being also formed with a forwardly extending passage opening through its rear end, means for attaching the bracket to a part of the automobile including a block located in the passage, a strap having its ends extending into the passage and interlocking with the block, and a fastening member for securing the block to the bracket, substantially as and for the purpose described.

9. A theft preventing device for motor cars comprising a supporting bracket, a telltale in the form of a leaf movably supported by the bracket and shiftable into different positions relatively thereto, means for locking the leaf to the bracket when in one of said positions, the bracket being also formed with a forwardly extending passage opening through its rear end, means for attaching the bracket to a part of the automobile including a block located in the passage, a strap having its ends extending into the passage and interlocking with the block, and a fastening member for securing the block to the bracket, the strap having its end portions formed with a series of perforations and the block having pins for entering perforations selectively, substantially as and for the purpose specified.

In testimony whereof I have hereunto signed my name, at Syracuse, in the county of Onondaga, and State of New York, this 11th day of May, 1918.

FRED G. DUTTON.